US 6,709,141 B1

(12) United States Patent
Sisti

(10) Patent No.: US 6,709,141 B1
(45) Date of Patent: Mar. 23, 2004

(54) AUTOMOTIVE WARNING LIGHT

(76) Inventor: Sebastian Sisti, 1687 Capeway Rd, Powhtan, VA (US) 23139

( * ) Notice: Subject to any disclaimer, the term of this patent is extended or adjusted under 35 U.S.C. 154(b) by 0 days.

(21) Appl. No.: 10/350,120

(22) Filed: Jan. 24, 2003

(51) Int. Cl.$^7$ .............................. B60Q 1/18; F21V 8/10
(52) U.S. Cl. ..................... 362/543; 362/259; 362/496; 362/505
(58) Field of Search ................... 362/259, 464–468, 362/496, 505, 507, 543–545; 340/468, 470–473, 478

(56) References Cited

U.S. PATENT DOCUMENTS

| | | | | |
|---|---|---|---|---|
| 3,704,446 A | * | 11/1972 | Walter | 340/468 |
| 3,908,179 A | * | 9/1975 | Heehler | 340/471 |
| 4,729,072 A | * | 3/1988 | Oroza | 362/543 |
| 4,916,587 A | | 4/1990 | Hirose et al. | 362/460 |
| 5,138,532 A | | 8/1992 | Shirai et al. | 362/462 |
| 5,207,496 A | | 5/1993 | Stanuch et al. | 362/35 |
| 5,258,740 A | * | 11/1993 | Viano et al. | 340/478 |
| 5,584,560 A | | 12/1996 | Gosswiller et al. | 362/524 |
| 5,599,085 A | * | 2/1997 | Tabata et al. | 362/467 |
| 5,798,691 A | * | 8/1998 | Tim Kao | 340/468 |
| 5,988,838 A | | 11/1999 | Rudenberg | 362/488 |
| 6,144,159 A | * | 11/2000 | Lopez et al. | 362/464 |
| 6,293,686 B1 | * | 9/2001 | Hayami et al. | 362/465 |
| 6,338,567 B1 | | 1/2002 | Denley | 362/515 |
| 6,406,172 B1 | * | 6/2002 | Harbers et al. | 362/544 |
| 6,428,196 B1 | | 8/2002 | Deguchi et al. | 362/515 |
| 6,481,865 B2 | * | 11/2002 | Woerner et al. | 362/544 |
| 6,520,669 B1 | * | 2/2003 | Chen et al. | 362/545 |

* cited by examiner

*Primary Examiner*—Alan Cariaso
(74) *Attorney, Agent, or Firm*—Richard C. Litman

(57) ABSTRACT

A warning illumination system adapted to be mounted on a motor vehicle (automobile, truck, motorcycle, etc.). In a preferred embodiment, the system is designed to project a single or a pair of light beams forwardly and angularly from the front of the vehicle. As contemplated the beam(s) is projected a distance of fifty to one hundred feet in front of the vehicle and at a horizontal angle across the vehicle which may range from forty-five to sixty degrees. For maximum effectiveness, it has been determined that the beam should be projected at a vertical angle so that it intersects the road at approximately a thirty degree angle. The thus projected beam reaches forward and across the lane of traffic, making the extreme end of the beam visible to an oncoming driver approaching from a hidden curve or blind corner. The beam is visible to the oncoming driver critical seconds before the approaching vehicle is visible. The beam can be directed either to the right or left depending on whether the vehicle is approaching a right hand or a left hand curve.

5 Claims, 4 Drawing Sheets

AUTOMOTIVE WARNING LIGHT

BACKGROUND OF THE INVENTION

1. Field of the Invention

The present invention relates to illumination devices. More specifically, the present invention is drawn to a warning light system for a motor vehicle.

2. Description of the Related Art

Many nighttime, dusk, dawn and inclement weather motor vehicular accidents are caused by the lack of adequate illumination produced by the vehicle's headlights. The situation is especially dangerous when two vehicles approach each other blindly at a hidden curve or a blind corner. Motor vehicle headlight beams are projected in a substantially forward direction along the path of travel (roadway lane). A driver in an approaching vehicle is unable to detect the straight-ahead projected beams if approaching from a hidden curve or blind corner. If either vehicle wanders even a little over the lane's dividing line, an accident could occur, resulting in damage, injury and/or death. A headlight system which would warn drivers in the above described scenario would certainly be a welcome addition to the art.

As indicated above, the industry standard is that the headlight beams are projected substantially in a straight line, thus precluding the chance that the beams could be seen around a blind curve or hidden corner. Examples of straight-ahead projected beams are disclosed in U.S. Pat. Nos. 4,916,587 (Hirose et al.), 5,138,532 (Shirai et al.), 6,338,567 B1 (Denley) and 6,428,196 B1 (Deguchi et al.). All of the above cited patents employ means to adjust the headlights to a degree, but none contemplate adjusting out of a substantially straight-ahead projection.

U.S. Pat. No. 5,207,496 (Stanuch et al.) is drawn to a mirror assembly for use with a warning light. The warning light of the instant patent is the type utilized by policemen, firemen, etc. for removable deployment on the dashboard of official vehicles. There is no desire by the patentee to angularly project light beams so as to warn vehicles approaching a hidden curve or blind corner of a street or highway.

U.S. Pat. No. 5,584,560 (Goswiller et al.) discloses a spotlight having motors for positioning a light beam at a desired azimuth and elevation such that there are no blind spots. The spotlight is not adaptable for integration into the headlight system of an automotive vehicle.

U.S. Pat. No. 5,988,838 (Rudenberg) relates to a high-candle powered device for illuminating the immediate area surrounding a stationary automobile to enhance personal safety.

None of the above inventions and patents, taken either singularly or in combination, is seen to disclose an automotive warning light as will be subsequently described and claimed in the instant invention.

SUMMARY OF THE INVENTION

The instant invention is drawn to a warning illumination system, which system is adapted to be mounted on a motor vehicle (automobile, truck, motorcycle, etc.). In a preferred embodiment, the system is designed to project a single or a pair of light beams forwardly and angularly from the front of the vehicle. As contemplated the beam(s) is projected a distance of fifty to one hundred feet in front of the vehicle and at an angle across the vehicle which may range from forty-five to sixty degrees. For maximum effectiveness, it has been determined that the beam should be projected at an angle so that it intersects the road at approximately a thirty degree angle. The thus projected beam reaches forward and across the lane of traffic, making the extreme end of the beam visible to an oncoming driver approaching from a hidden curve or blind corner. The beam is visible to the oncoming driver critical seconds before the approaching vehicle is visible. The beam can be directed either to the right or left depending on whether the vehicle is approaching a right hand or a left hand curve. Although the instant illumination system is intended to be integrated into a new vehicle's basic lighting system and match the vehicle's high beam intensity, it is obvious that the system may be incorporated as independent lamps mounted on the front bumper or roof of an existing vehicle. Conventional ON/OFF switches, mounted on or adjacent the vehicle's dashboard, are employed to activate and deactivate the system. The beams may be adjusted to project a crisscross pattern in a single lane. This arrangement is especially effective on the approach to left hand curves.

A second embodiment of the invention incorporates pulsed laser lights that would be incorporated in the bumper of the vehicle.

Accordingly, it is a principal object of the invention to provide a warning light system for a motor vehicle.

It is another object of the invention to provide a warning light system for a motor vehicle, which system is effective to alert the driver of an approaching vehicle.

It is a further object of the invention to provide a warning light system for a motor vehicle, which system projects a light beam at an angle to the path of travel of the vehicle.

Still another object of the invention is to provide a warning light system, which system is effective to alert approaching drivers at hidden curves and blind corners.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
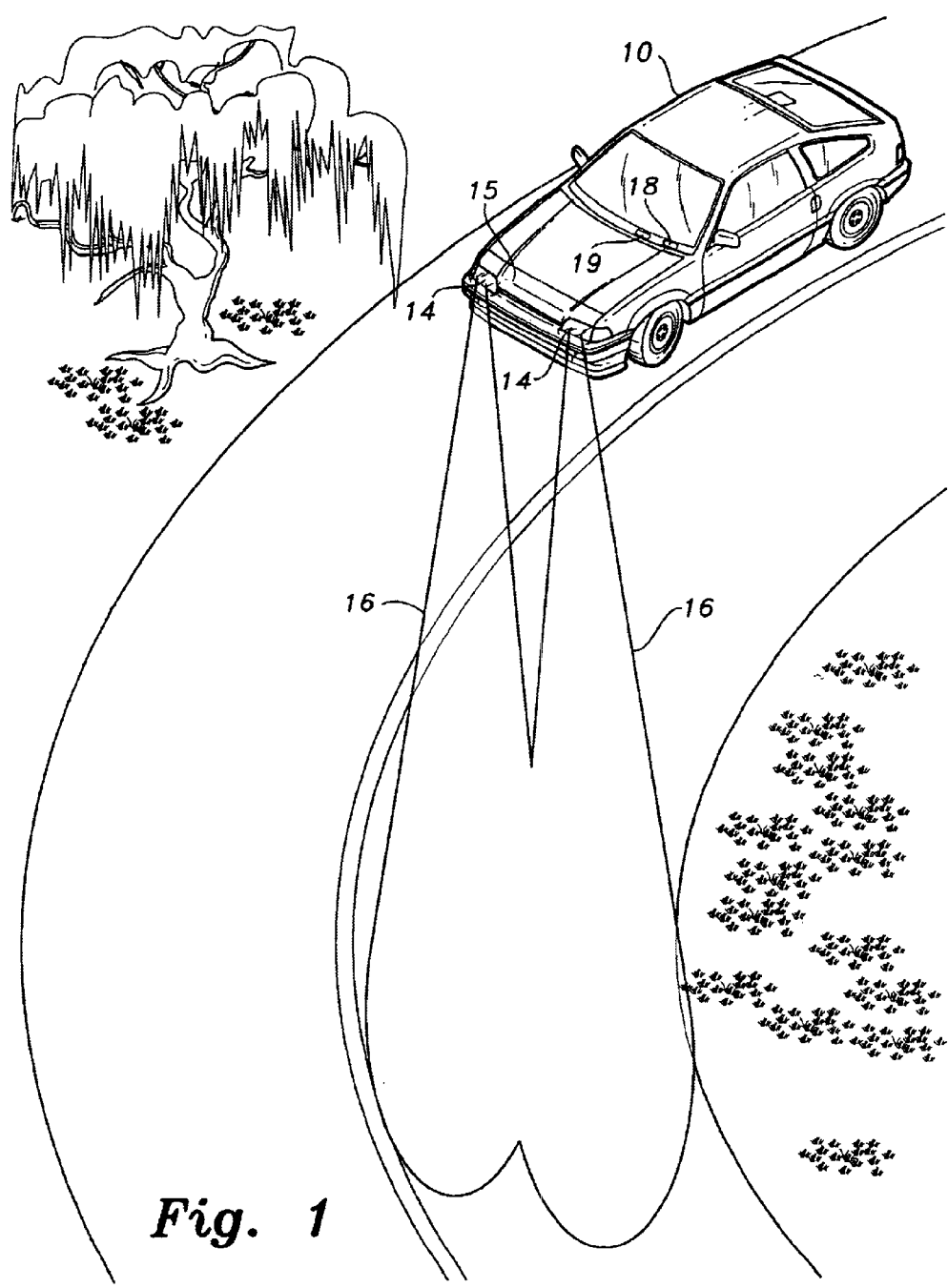
FIG. 1 is an environmental, perspective view of a motor vehicle warning light system according to the present invention.
Figure 2:
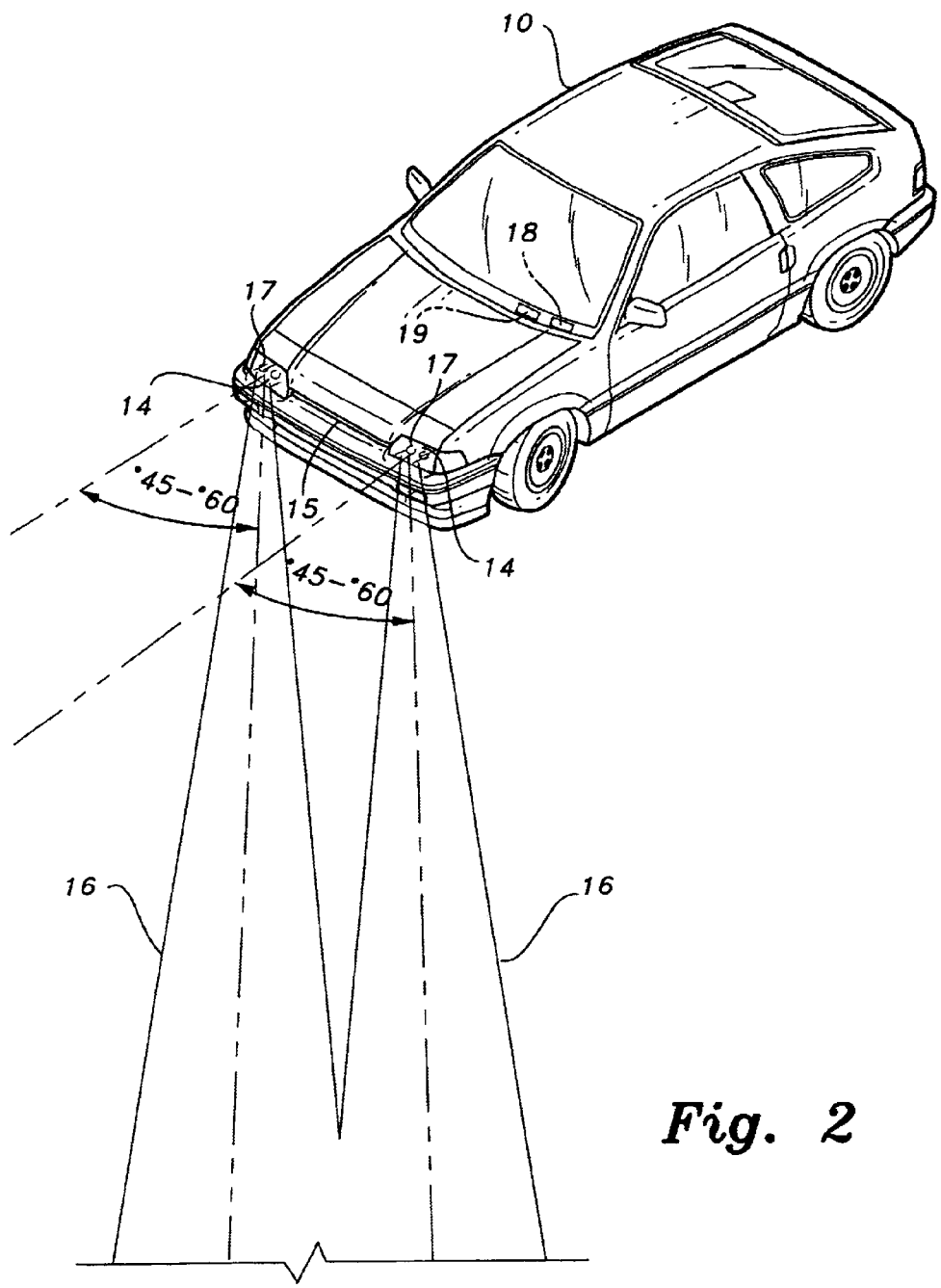
FIG. 2 is a partial perspective view of a motor vehicle warning light system directed in an angled pattern according to the present invention.

Attention is first directed to FIGS. 1 and 2 of the drawings wherein a preferred embodiment of the present invention is incorporated in an automobile 10. The headlight system of automobile 10 includes a set of headlight bodies 14, which lamps employ light emitting lamps 17 (shown in phantom lines) that are set to project beams 16 forwardly and at an angle to the path of travel of the automobile. Each lamp 14 is set so that the distance of projection of each beam is between fifty and one hundred feet forwardly of the front end 15 of the automobile. Each beam 16 is directed horizontally at an angle between forty-five and sixty degrees relative to the front end 15 of the automobile, such that the beams are projected across the traffic lane. Each beam is projected vertically downward at an angle of sixty degrees relative to the front end so that it intersects the road at an angle of approximately thirty degrees. A control switch 18 is disposed inside the automobile and functions to control operation of lamps 17. As illustrated, the beams are directed to the left as the automobile approaches a left-hand curve. The control switch 18 is operative to turn the lamps on so that beams 16 are directed to the right when approaching a right-hand curve. It is also contemplated that a single beam could be utilized in lieu of the pair as shown.

Figure 3:
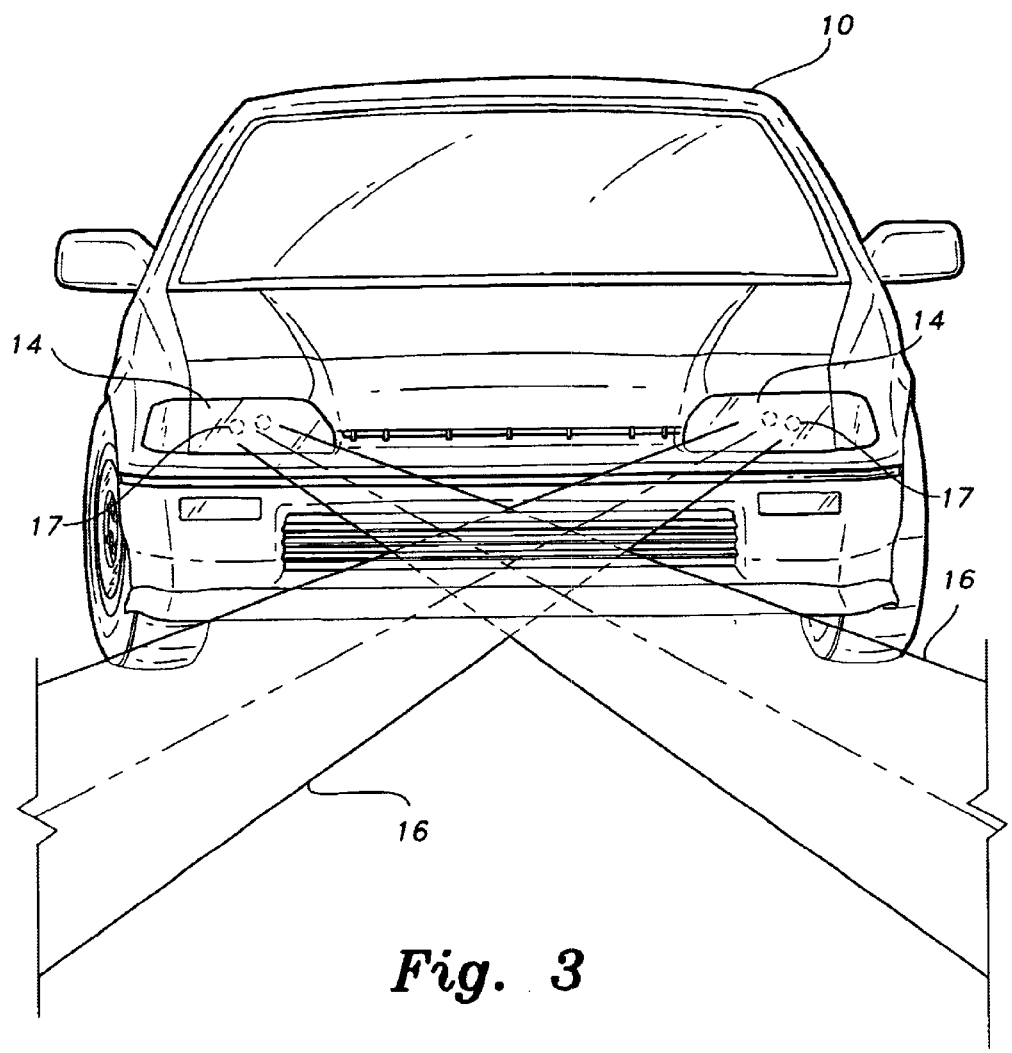
FIG. 3 is a partial perspective view of a motor vehicle warning light system directed in a crossing pattern according to the present invention.
Figure 4:
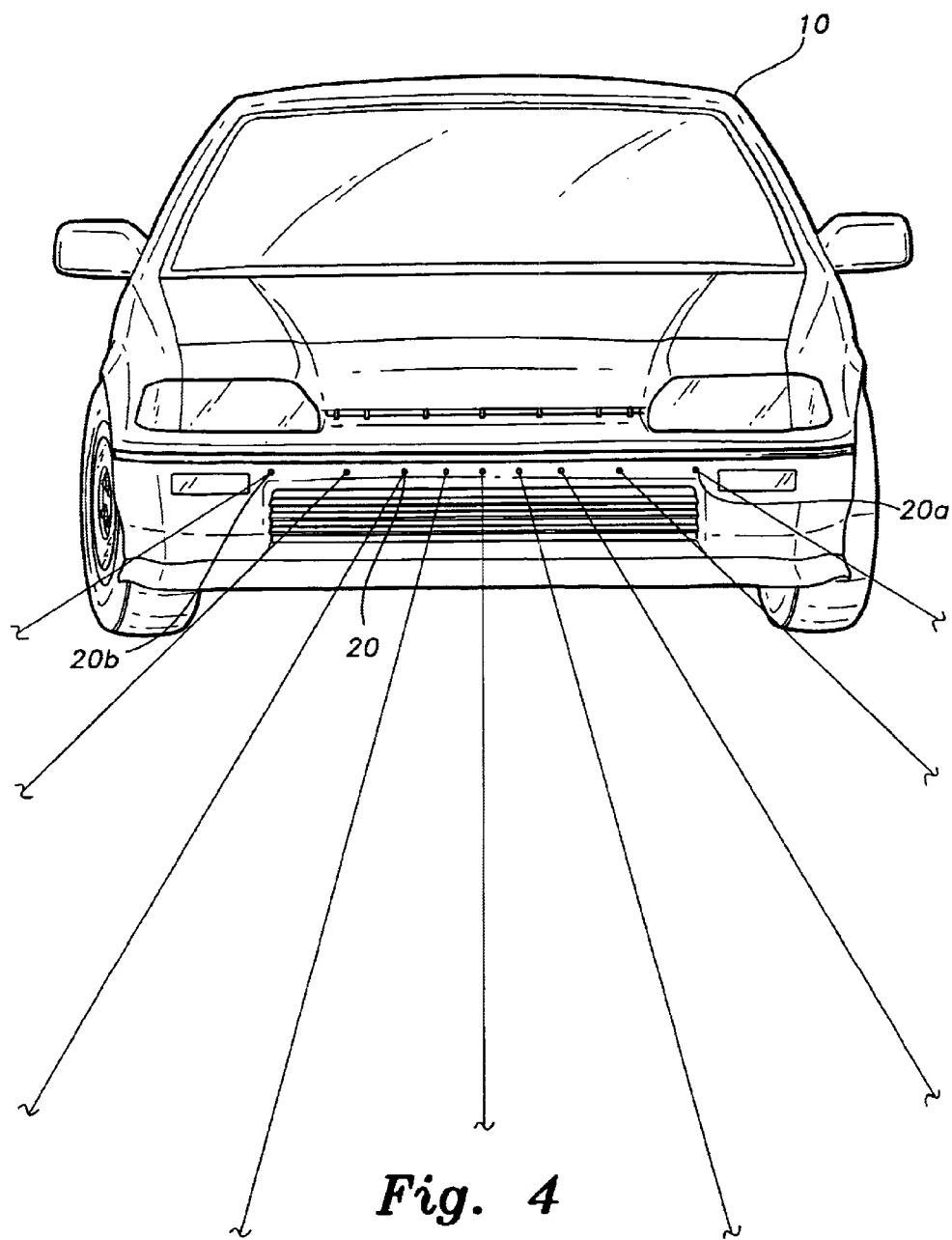
FIG. 4 is a partial perspective view of a motor vehicle warning light system employing multiple laser lights according to the present invention.

A second scenario of the instant invention is best seen in FIG. 3 which shows a pair of lamps 14 projecting beams 16 in an X-pattern. As in the embodiment described above, the lamps are set to project each beam horizontally at an angle between forty-five and sixty degrees relative to the front end of the automobile and vertically downward so that they intersect the road at an angle of approximately thirty degrees. The X-pattern projection prepares for warning for both a right or left curve approach. The beams from the lamps may be configured to operate in pulsed rhythms by means of a pulsing circuit.

FIG. 3 incorporates a warning beam system consisting of a bank of six to ten pulsing laser lights 20 disposed at bumper level. Each light does not exceed 10 mws. The extreme right hand and left hand lights 20a, 20b are set at anywhere from forty-five to sixty degree angles fanning outward to the respective right or left. The remaining lights gradually grade to ninety degrees at the center of the bumper. The lights 20 are designed to emit a green color since green is more effective in daylight.

It is also contemplated that the rear lights of the vehicle could be expanded to include a third lamp to warn drivers behind you of an approaching curve. The added lamp would emit the same color as the front warning system and would do so simultaneously and automatically. The third lamp would be embossed with a reverse "C" on the left and a normal "C" on the right.

It is to be understood that the present invention is not limited to the embodiments described above, but encompasses any and all embodiments within the scope of the following claims.

I claim:

1. A motor vehicle warning light comprising:

a motor vehicle having a substantially vertical planar surface defining a front end;

at least one headlight body affixed to said front end;

light emitting lamps disposed in said headlight body directed and configured to project a beam of green colored pulsating light a distance of fifty to one hundred feet forwardly of said front end and at an acute horizontal angle in a range from forty-five to sixty degrees relative to said front of said motor vehicle, whereby said beam is directed across a traffic lane and a at an acute vertically downward angle of sixty degrees relative to said front end of said motor vehicle whereby said beam intersects a road at an angle of approximately thirty degrees.

2. A motor vehicle warning light as recited in claim 1, wherein a switch is disposed in said motor vehicle to selectively operate said light emitting lamps.

3. A motor vehicle warning light comprising:

a motor vehicle having a substantially vertical planar surface defining a front end;

an array of green-colored, pulsating, laser warning lights horizontally affixed across said front end extending from an extreme left end to an extreme right end, wherein the pulsating lights disposed on said extreme left end and said extreme right end each being directed to project a beam of light at acute horizontal angle and an acute vertically downward angle relative to said front end.

4. A motor vehicle warning light as recited in claim 3, wherein each said horizontal acute angle is in a range from forty-five to sixty degrees relative to said front end whereby said beam is directed across a traffic lane.

5. A motor vehicle warning light as recited in claim 4, wherein each said acute vertically downward angle is approximately sixty degrees relative to said front ends, whereby said beam intersects a road an angle of approximately thirty degrees.

\* \* \* \* \*